US007149405B2

(12) United States Patent
Lim et al.

(10) Patent No.: US 7,149,405 B2
(45) Date of Patent: Dec. 12, 2006

(54) ELECTRO-OPTICAL SUBASSEMBLIES AND METHOD FOR ASSEMBLY THEREOF

(75) Inventors: Alvin Tze Yen Lim, Singapore (SG); Adrianus J. P. van Haasteren, Singapore (SG); Frank J Flens, Singapore (SG)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 10/904,223

(22) Filed: Oct. 29, 2004

(65) Prior Publication Data

US 2006/0093305 A1 May 4, 2006

(51) Int. Cl.
*G02B 6/00* (2006.01)
*G02B 6/32* (2006.01)

(52) U.S. Cl. ........................................ 385/147; 385/33

(58) Field of Classification Search ..................... None
See application file for complete search history.

(56) References Cited

U.S. PATENT DOCUMENTS 5,325,455 A * 6/1994 Henson et al. ................ 385/89
5,333,224 A * 7/1994 Kikuchi ....................... 385/93
5,591,966 A 1/1997 Harada et al.
5,687,270 A * 11/1997 Takizawa ..................... 385/94
5,841,924 A * 11/1998 Mugiya et al. ............... 385/93
6,179,483 B1 * 1/2001 Kanazawa ................... 385/93
6,862,384 B1 * 3/2005 Koshi et al. .................. 385/34
6,863,452 B1 * 3/2005 Takada ........................ 385/93
2004/0089640 A1 * 5/2004 Bager et al. ........... 219/121.64
2004/0234214 A1 * 11/2004 Zheng ........................ 385/94
2004/0244905 A1 * 12/2004 Sallavanti et al. ....... 156/272.8

FOREIGN PATENT DOCUMENTS

EP 0441001 A1 8/1991
JP 03180090 A 8/1991
JP 2002116354 A 4/2002

* cited by examiner

*Primary Examiner*—Sung Pak

(57) ABSTRACT

An electro-optical subassembly generally includes a base supporting at least one lead and a lens unit having a lens. The lead supports an electro-optical component. The lens unit is through transmission laser welded to the base such that the lens is aligned with the electro-optical component.

10 Claims, 4 Drawing Sheets

ELECTRO-OPTICAL SUBASSEMBLIES AND METHOD FOR ASSEMBLY THEREOF

BACKGROUND OF THE INVENTION

Electro-Optical (EO) components, like single mode transmitter/receiver optical sub-assemblies used in transmitters and receivers in fiber communication, are usually packaged utilizing transistor outline construction (sometimes referred to as a "TO can"). The EO components inside a TO can are wire-bonded to a number of leads that protrude through the package and allow signals to be routed to the EO components. These leads are bent and soldered onto a PCB board that contains the electronic components and circuitry to drive the EO components.

A TO can has several disadvantages. The packaging process requires significant human labor with multiple alignment processes. Current methods are very much cottage industry like—often described a being akin to building a ship in a bottle. A large fraction of the cost of single mode transmitter/receiver optical subassemblies is associated with the packaging process.

The leads on known TO can structures are typically a few millimeters in length and can cause a degradation of the frequency response of the subassembly. The leads also have to be bent and soldered onto the PCB board. This process is difficult to automate and is typically performed by hand. Yet another disadvantage is the mechanical tolerances stack up, e.g. the tolerance for the lens placement is affected by die placement. This requires that each component be positioned using a dedicated three-alignment system: one for die placement; one for lens placement; and one for the receptacle.

The present inventors have recognized a need for an electro-optical subassembly wherein the packaging process can be automated while avoiding at least some of the disadvantages of known TO cans.

DETAILED DESCRIPTION

Figure 1:
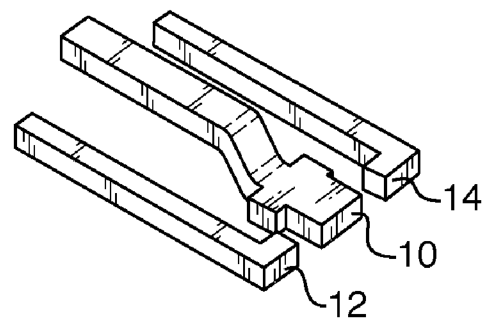
FIG. 1 is an isometric view of a lead frame in accordance with an embodiment of the present invention.

Reference will now be made in detail to the present invention, examples of which are illustrated in the accompanying drawings, wherein like reference numerals refer to like elements throughout.

FIG. 1 is an isometric view of a lead frame in accordance with an embodiment of the present invention. Fabrication of an electro-optical subassembly 100 (see FIG. 5) starts with the stamping of a set of leads from, for example, copper or tungsten copper. The central lead 10 supports one or more optical electrical components, such as edge emitting lasers, PIN detectors, Fabry Perot cavity lasers and VCSELs. The two flanking leads 12 and 14 may supply power or, depending on the desired configuration, act as ground.

Figure 2:
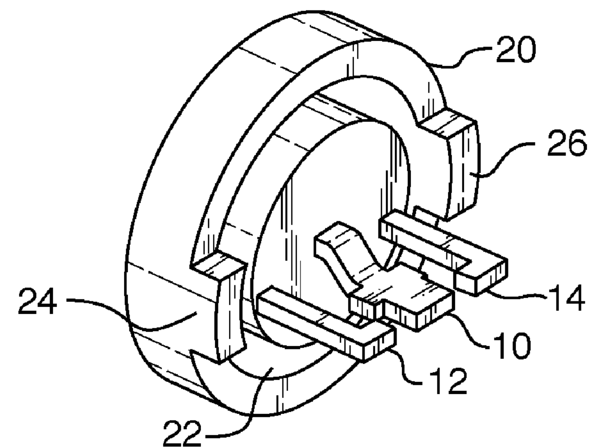
FIG. 2 is an isometric view of a pre-molded lead frame in accordance with an embodiment of the present invention.

FIG. 2 is an isometric view of a pre-molded lead frame in accordance with an embodiment of the present invention. A body 20 is molded over the leads 10–14. The body 20 is generally circular and encompasses the central portion of the leads 10, 12, and 14. The body 20 may be provided several features to assist with alignment. For example a cavity 22 and projections 24 and 26 may be used to assist with alignment of a laser with a lens unit.

The body 20 may be molded from a variety of materials including plastics. However, it may prove advantageous to use liquid crystal polymer ("LCP") for stability over a broad range of temperatures. LCP is a thermoplastic fiber with exceptional strength and rigidity (five times that of steel), and about 15 times the fatigue resistance of aramid. Very good impact resistance. LCP doesn't absorb moisture, has very low stretch, doesn't creep like UHMW-PE fibre, and has excellent abrasion, wear, and chemical resistance. LCP's high melting-point (320 C) allows the retention of these properties over broad ranges of temperatures.

LCP has an unusual property of anisotropic coefficient of thermal expansion due to a molecular structure comprising highly ordered linear chains which are melt oriented. The polymer chain undertake a regular orderly crystal like orientation during solidification in a mold. By gating at the rear of the body 20, the flow direction can be aligned in the Z-axis (parallel to the longitudinal axis of the leads 12 and 14) of the subassembly reducing expected drifts to an acceptable level based on the low CTE of LCP (<5 ppm). The expansion in the X-Y directions should closely match the expected expansion of a polymer lens (~50 ppm)—effectively minimizing movement due to temperature shifts about the optical axis of the lens.

Figure 3:
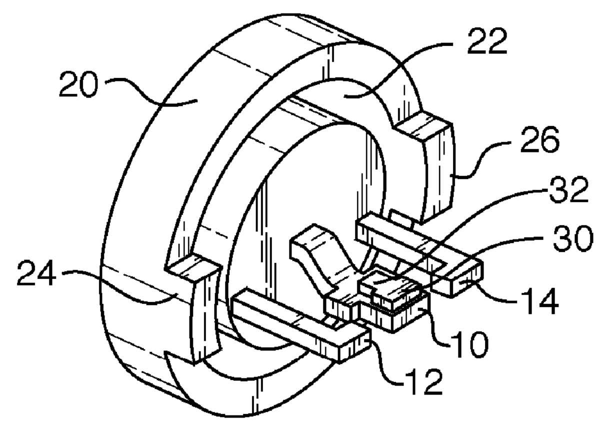
FIG. 3 is an isometric view of a pre-molded lead frame in accordance with an embodiment of the present invention.

FIG. 3 is an isometric view of a pre-molded lead frame in accordance with an embodiment of the present invention. FIG. 3 illustrates the placement of an edge-emitting laser 30 and a PIN monitor 32 on the central leads 10. The laser 30 and monitor 32 may be electrically connected to the leads 12 and 14 with wire bonding.

Figure 4:
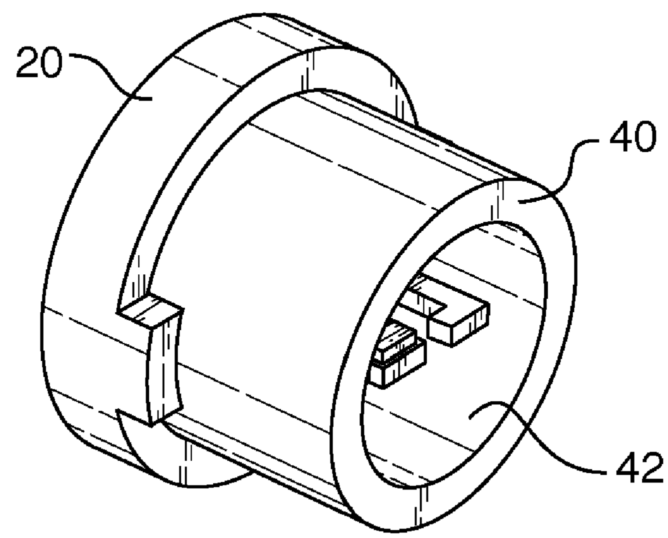
FIG. 4 is an isometric view of a partial optical sub-assembly in accordance with an embodiment of the present invention.

FIG. 4 is an isometric view of a partial optical sub-assembly in accordance with an embodiment of the present invention. A spacer in the form of a molded hollow cylinder 40 is formed and inserted into the groove 22 of the body 20. A cavity 42 of the cylinder 40 surrounds the portion of the leads 10, 12, and 14 extending from the face of the body 20 along the Z-axis thereby protecting the laser 30 and monitor 32. The length of the cylinder 40 is determined by the optical properties of the laser 30, monitor 32 and the lens used in the electro-optical subassembly 100 (see element 52 in FIG. 5).

As with the body 20, the cylinder 40 may be molded from a variety of materials including plastics. However, it may prove advantageous to use LCP. Further, it may prove advantageous to mold the spacer/cylinder 40 as part of the body 20 or the lens unit 50 (see FIG. 5).

Figure 5:
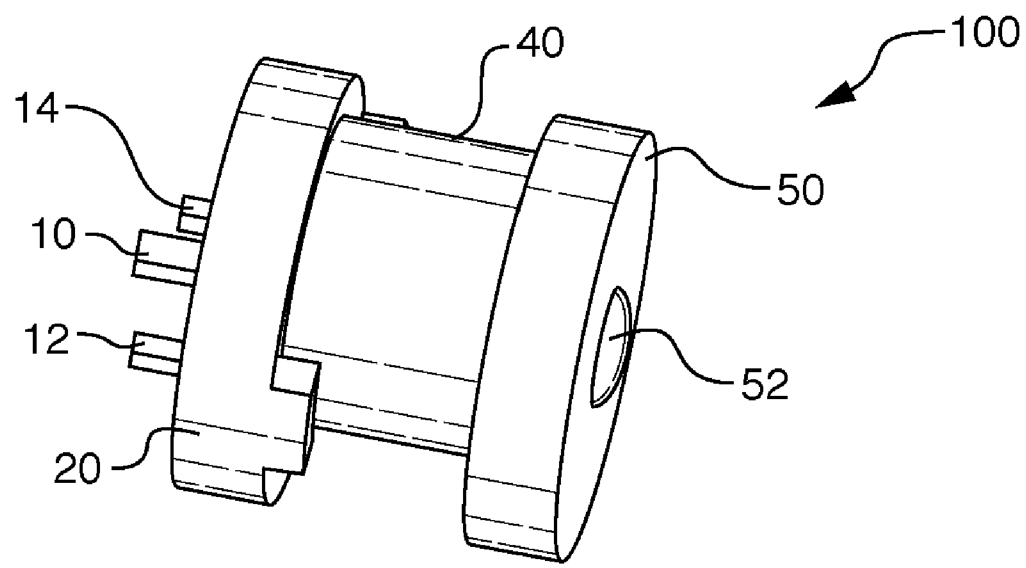
FIG. 5 is an isometric view of an optical sub-assembly in accordance with an embodiment of the present invention.

FIG. 5 is an isometric view of an optical sub-assembly in accordance with an embodiment of the present invention. To complete the electro-optical subassembly 100, a lens unit 50 is attached to the cylinder 40. The lens unit is provided with a lens 52, such as an aspherical lens. The lens unit 52 is generally shaped like a cap and slides over the cylinder 40. By closely controlling the surfaces of the body 20, the cylinder 40 and the lens unit 50, the laser 30 and the lens 52 can be precisely aligned within acceptable tolerances (in the sub-micron range).

It may prove beneficial to mold the lens unit 50 using a polymer. The use of polymer, as opposed to traditional glass, permits the formation of intricate 3-D geometry for registration purposes as well as the ability to couple more light. Further, polymer lens lend themselves to mass production—reducing the overall cost of the electro-optical subassembly 100.

The cylinder 40 may be affixed to the base 20 and the lens unit 50 using epoxy. However, it should be noted that the use of epoxy may increase the possibility of drift (especially during cure) and may prove difficult to apply to the small parts comprising the electro-optical subassembly 100. For example, the overall length of the electro-optical subassembly 100 may be smaller than 6 mm while the diameter of the cylinder 40 may be smaller than 5 mm.

A more suitable joining technique is through transmission laser welding (TTLW). TTLW, well known method for joining two thermoplastics part, is undergoing a renaissance with the introduction of IR absorbing dyes allowing clear-to-clear polymer transmission welding. Older TTLW techniques required that the first part to be joined had to be optically transparent and the second part had to absorb the laser energy. With the new IR absorbing dyes, the second part can also be optically transparent.

In TTLW, a laser passes though the optically clear part impinging on the second part with the IR absorbing dye. The second part absorbs the laser creating heat that in turn leads to plastification. The resultant local increase in volume of the second (absorbent) part causes a surface contact with the first part (translucent) that causes plastification of the second part creating the weld. With the use of appropriate jigs, movement between the two parts during the welding process may be minimized. Further, as the heat is localized to the joint, the parts experience little or no heat based distortion. The strength of the joint is quite high and may exceed that of the individual parts.

In the present invention, the second part may comprise the cylinder 40 which can be doped with IR absorbing dye. The first part could be one or both of the body 20 and the lens unit 50. TTLW techniques and apparatus are well suited for the cylindrical shape of the joints between the base 20, the cylinder 40 and the lens unit 50 such that it is possible to create a hermitically sealed electro-optical subassembly 100. Further, as TTLW operations are suitable for large batch operations, the manufacturing of the electro-optical subassembly 100 can be automated to a level similar to that found in the microelectronic industry.

It will be appreciated by those skilled in the art that changes may be made in the described embodiments without departing from the principles and spirit of the invention, the scope of which is defined in the claims and their equivalents. For example, while the base 20, cylinder 40 and lens unit 50 have been described as being cylindrical, different shapes and configurations may prove beneficial.

Figure 6:
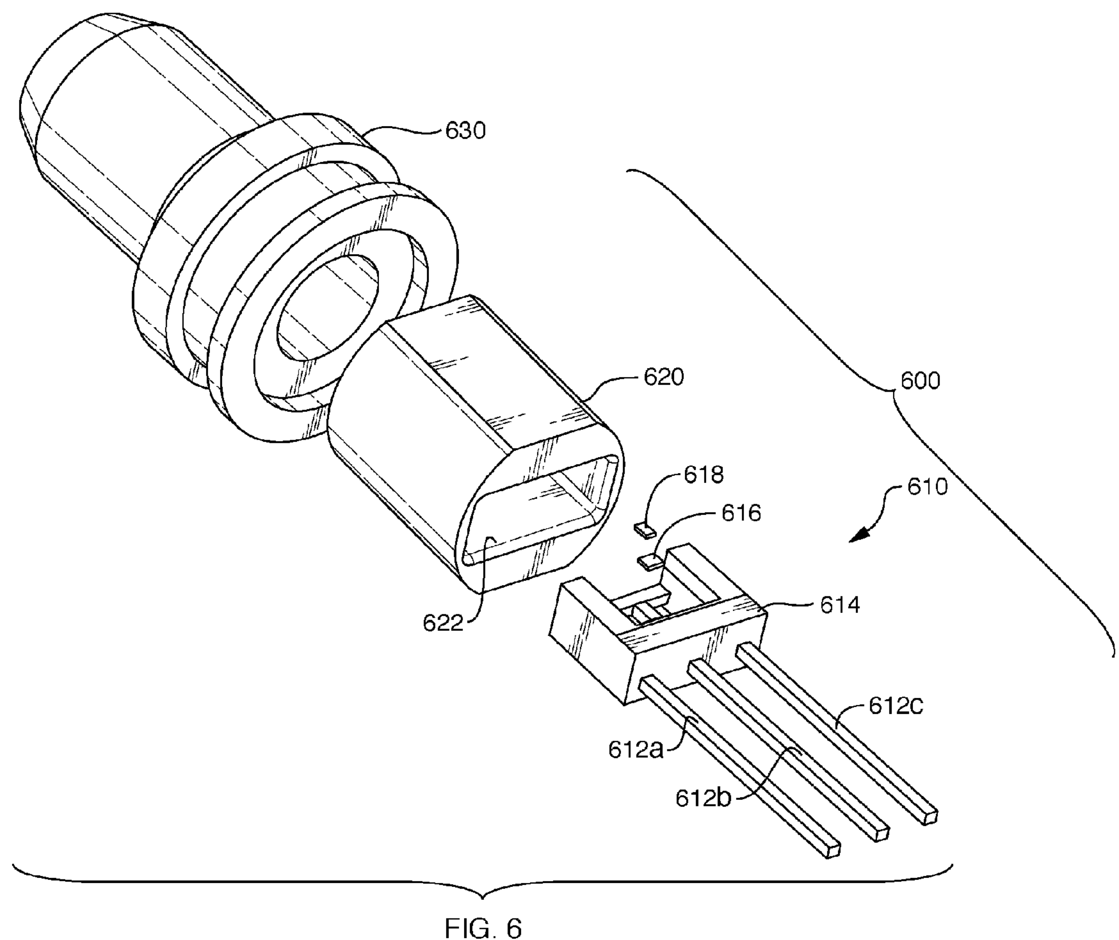
FIG. 6 is an isometric view of an electro-optical subassembly in accordance with an embodiment of the present invention.

FIG. 6 is an isometric view of an alternative configuration which may prove beneficial. The electro-optical assemble 600 generally comprises a base 610, an optical unit 620. The base 610 generally comprises a collection of leads 612 partially encased by a wedge shaped molded body 614. Electro-optical components, such as a laser 616 and a PIN detector 618, are fixed to one or more leads 612*n*. The optical unit 620 has a wedge shaped cavity 622 that accepts the base 610 and facilitates alignment of the electro-optical components (such as 616 and 618) with an optical lens (not visible) formed as part of the optical unit 620. The electro-optical subassembly 610 mates with a port 630 that facilitates alignment of the optical unit 620 with an optical cable (not shown). The optical unit 620 and the base 610 are joined using TTLW.

The electro-optical assembly 600 provides many advantageous. The body 614 has two wedge shaped arms defining a central opening for holding the optical components. The leads 612*n* can be formed using standard technologies and, if desired, can be configured to facilitate surface mounting the electro-optical subassembly 600 onto a PCB board (not shown). The design of the base 610 allows the overall size of the electro-optical subassembly 600 to be reduced as compared to a TO-can. This size reduction minimizes disruptive thermal expansions and reduces the distance between the electro-optical components and the optical lens. Further, as the leads 612*n* are anchored into the modeled body 614, overall rigidity is increased. The emitting surface of the laser 616 can be accurately positioned relative to the optical lens making Z-alignment of the port 630 redundant. Since the optical lens and the laser 616 are referenced against the same base, XY-alignment of the lens may be redundant, reducing the typical three-alignment process to a two-alignment process.

Figure 7:
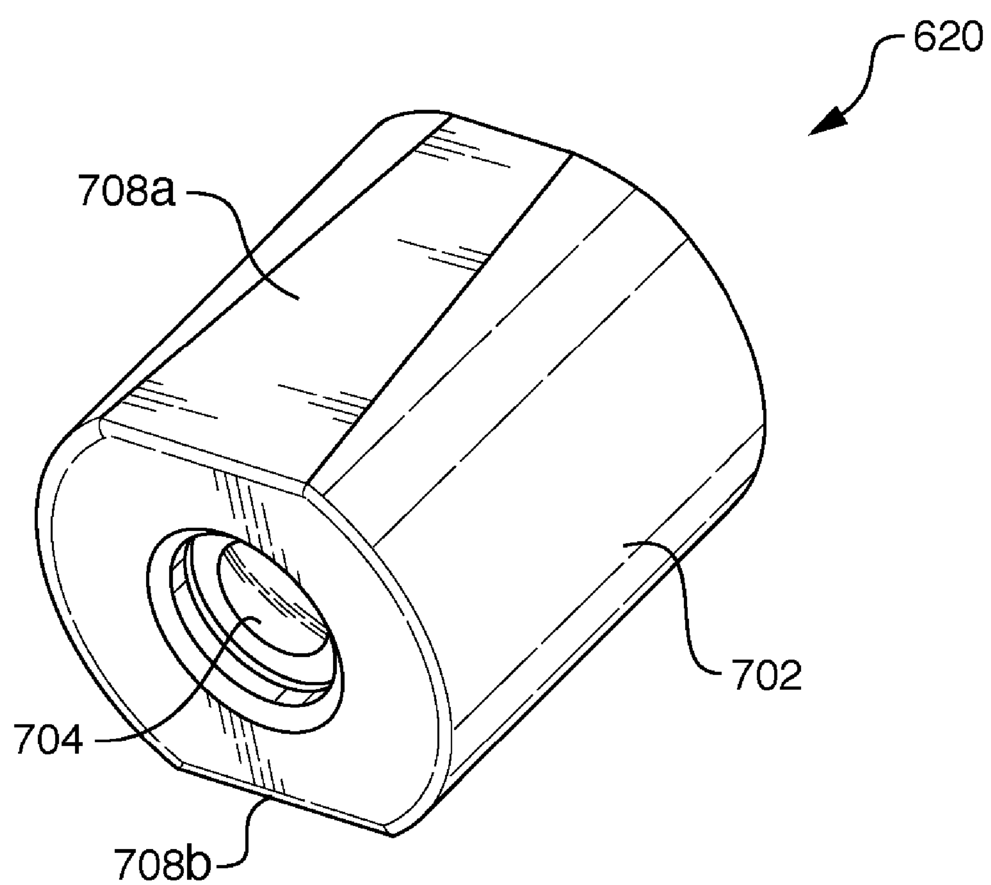
FIG. 7 is an isometric view of an optical unit in accordance with an embodiment of the present invention.

FIG. 7 is an isometric view of an optical unit 620 in accordance with an embodiment of the present invention. The optical unit 620 generally comprises a body portion 702 and a lens 704. The body portion 702 generally comprises a frustum having two opposing flat surfaces 708*a* and 708*b*. The opposing flat surfaces 708*a* and 708*b* may be molded or ground into the body and serve as alignment features. The lens 704 may comprise an aspherical lens. The exact configuration of the lens 704 will be determined by the required function, for example coupling the light from a laser with an optical fiber and/or coupling the light from the optical fiber to the PIN detector. The lens 704 may be molded with the body 702 and then provided with a clear optical surface. Alternatively, the lens 704 may be turned after the body 702 has been molded.

What is claimed is:

1. An electro-optical subassembly comprising:
- a hollow cylinder;
- a base supporting at least one lead, the base and hollow cylinder being attached to each other at one or more through-transmission laser welds (TTLW's) sandwiched between adjoining surfaces at a first end of the hollow cylinder such that the at least one lead extends into the cylinder;
- an electro-optical component supported by the at least one lead; and
- a lens unit having a lens, the lens unit and hollow cylinder being attached to each other at one or more TTLW's sandwiched between adjoining surfaces at a second end of the hollow cylinder such that the lens is aligned with the electro-optical component.

2. An electro-optical subassembly, as set forth in claim 1, wherein the base comprises liquid crystalline polymer.

3. An electro-optical subassembly, as set forth in claim 1, wherein the cylinder comprises liquid crystalline polymer.

4. An electro-optical subassembly, as set forth in claim 1, wherein the lens comprises polymer.

5. An electro-optical subassembly comprising:
- a base supporting at least one lead;
- an electro-optical component supported by the at least one lead; and
- a lens unit having a lens, the lens unit and base being attached to each other at one or more through-transmission laser welds (TTLW's) sandwiched between adjoining surfaces such that the lens is aligned with the electro-optical component.

6. An electro-optical subassembly, as set forth in claim 5, wherein the lens unit comprises a body having a cavity at a first end in communication with the lens, the lens being formed in a second end of the body.

7. An electro-optical subassembly, as set forth in claim 6, wherein the base is inserted into the cavity.

8. An electro-optical subassembly, as set forth in claim 7, wherein the base is wedge shaped.

9. An electro-optical subassembly, as set forth in claim 5, wherein the base comprises liquid crystalline polymer.

10. An electro-optical subassembly, as set forth in claim 5, wherein the lens unit comprises liquid crystalline polymer.

* * * * *